(12) United States Patent
Niemi et al.

(10) Patent No.: US 11,070,533 B2
(45) Date of Patent: Jul. 20, 2021

(54) ENCRYPTED SERVER NAME INDICATION INSPECTION

(71) Applicant: Forcepoint LLC, Austin, TX (US)

(72) Inventors: Olli-Pekka Niemi, Helsinki (FI); Andrew Mortensen, Ann Arbor, MI (US); Valtteri Rahkonen, Kauniainen (FI)

(73) Assignee: Forcepoint LLC, Austin, TX (US)

( * ) Notice: Subject to any disclaimer, the term of this patent is extended or adjusted under 35 U.S.C. 154(b) by 113 days.

(21) Appl. No.: 16/598,657

(22) Filed: Oct. 10, 2019

(65) Prior Publication Data

US 2021/0112040 A1    Apr. 15, 2021

(51) Int. Cl.
*H04L 29/06* (2006.01)
(52) U.S. Cl.
CPC ...... *H04L 63/0442* (2013.01); *H04L 63/0485* (2013.01); *H04L 63/20* (2013.01)
(58) Field of Classification Search
CPC .. H04L 63/0442; H04L 63/20; H04L 63/0485
See application file for complete search history.

(56) References Cited

U.S. PATENT DOCUMENTS

| | | | | |
|---|---|---|---|---|
| 6,076,167 A * | 6/2000 | Borza | ..................... | G06F 21/32 726/5 |
| 8,204,831 B2 * | 6/2012 | Jonas | .................. | G06F 21/6245 705/50 |
| 10,075,469 B1 * | 9/2018 | Brown | ................ | H04L 63/0428 |
| 10,637,929 B1 * | 4/2020 | Rai | ...................... | H04L 65/1046 |
| 2002/0023143 A1 * | 2/2002 | Stephenson | ........... | H04L 63/061 709/218 |
| 2002/0087479 A1 * | 7/2002 | Malcolm | ................ | G06Q 10/06 705/64 |
| 2002/0099663 A1 * | 7/2002 | Yoshino | ................. | G06Q 30/06 705/65 |
| 2016/0140328 A1 * | 5/2016 | Pathak | ................ | G06F 21/6209 726/1 |
| 2016/0241389 A1 * | 8/2016 | Le Saint | .................. | H04L 9/14 |
| 2019/0327263 A1 * | 10/2019 | Jalio | ..................... | G06F 21/567 |
| 2020/0092264 A1 * | 3/2020 | Rahkonen | ............. | H04L 63/166 |
| 2020/0099719 A1 * | 3/2020 | Rahkonen | ........... | H04L 67/2852 |
| 2020/0128032 A1 * | 4/2020 | Halme | ................... | H04L 63/20 |

* cited by examiner

*Primary Examiner* — Matthew Smithers
*Assistant Examiner* — Mirza Israr Javed
(74) *Attorney, Agent, or Firm* — Jackson Walker L.L.P.

(57) ABSTRACT

A method, system, and computer-usable medium are disclosed for: (i) determining if a server response from a server received at a security device and intended for a client includes original encryption key information for encrypting identifying information associated with the server; (ii) if the server response includes original encryption key information for encrypting identifying information associated with the server, determining if a network policy provides for decryption of identifying information associated with the server; and (iii) if the network policy provides for decryption of identifying information associated with the server, replacing the original encryption key information with modified encryption key information associated with the security device and communicating the server response to the client with the modified encryption key information associated with the security device.

24 Claims, 4 Drawing Sheets

ENCRYPTED SERVER NAME INDICATION INSPECTION

FIELD OF DISCLOSURE

The present invention relates in general to the field of computers and similar technologies, and in particular to software utilized in this field. Still more particularly, it relates to a method, system, and computer-usable medium for performing inspection of an encrypted server name indication.

BACKGROUND

While network communication among networked computers, including the use of the Internet, has many advantages, one downside to network communication is that it may render networked computers susceptible to malicious attacks from viruses or other intrusions. One common way in which to protect an endpoint device from malicious attacks is the use of encryption, such as Transport Layer Security (TLS) encryption.

While encrypted Server Name Indication extensions were absent in the TLS 1.3 standard, its standards working group is actively developing a standard for encrypted Server Name Indication. Encrypted Server Name Indication may be problematic for existing security devices, as it may prevent security devices from making policy decisions during the handshake phase of a TLS session. Many security devices currently use plaintext Server Name Indication for tasks such as Uniform Resource Locator (URL) categorization, application identification, and deciding whether to bypass TLS decryption for certain domains. As specified in the current draft for the encrypted Server Name Indication (ESNI) standard, ESNI operation may use domain name service (DNS) to publish ESNI public keys (ESNIKeys) as Base64-encoded structured data in text (TXT) records. Client devices may extract ESNI public keys from the DNS response, and then may use those keys to encrypt Server Name Indication prior to sending the TLS client-hello handshake message to the server.

The TLS 1.3 standard requires that middlebox security devices acting as a TLS "man in the middle" (MITM) proxies remove any extension they do not recognize. According to the ESNI draft standard, removal of the ESNI extension by an MITM TLS proxy may do one of two things: (i) cause a handshake failure between client and server; or (ii) cause the server to present a default certificate to the client. In the default certificate case, the client may detect that the certificate does not match the domain that the client originally requested. The client may in response contact the server using plaintext Server Name Indication (SNI) to establish a TLS connection to the correct domain. This solution may decrease security unless the security device also upgrades the TLS client-hello message to use ESNI when it decides to perform message decryption. As a result, ESNI would not be enabled in server protection mode in which the security device decrypts incoming connections (e.g., as with cloud-provided security services or when certain TLS connections are configured to bypass MITM decryption). Other alternatives to implement policy decisions with ESNI could use a cache based on DNS requests, but such solution may not work when the server provides services for multiple domains, or (as is the case for most large services) the server is part of a content distribution network.

SUMMARY

In accordance with the teachings of the present disclosure, certain disadvantages and problems associated with existing approaches to network and data security have been reduced or eliminated.

In accordance with embodiments of the present disclosure, a computer-implementable method for managing network communication may include: (i) determining if a server response from a server received at a security device and intended for a client includes original encryption key information for encrypting identifying information associated with the server; (ii) if the server response includes original encryption key information for encrypting identifying information associated with the server, determining if a network policy provides for decryption of identifying information associated with the server; and (iii) if the network policy provides for decryption of identifying information associated with the server, replacing the original encryption key information with modified encryption key information associated with the security device and communicating the server response to the client with the modified encryption key information associated with the security device.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor. The instructions may be configured for: (i) determining if a server response from a server received at a security device and intended for a client includes original encryption key information for encrypting identifying information associated with the server; (ii) if the server response includes original encryption key information for encrypting identifying information associated with the server, determining if a network policy provides for decryption of identifying information associated with the server; and (iii) if the network policy provides for decryption of identifying information associated with the server, replacing the original encryption key information with modified encryption key information associated with the security device and communicating the server response to the client with the modified encryption key information associated with the security device.

In accordance with these and other embodiments of the present disclosure, a non-transitory, computer-readable storage medium may embody computer program code, the computer program code comprising computer executable instructions configured for: (i) determining if a server response from a server received at a security device and intended for a client includes original encryption key information for encrypting identifying information associated with the server; (ii) if the server response includes original encryption key information for encrypting identifying information associated with the server, determining if a network policy provides for decryption of identifying information associated with the server; and (iii) if the network policy provides for decryption of identifying information associated with the server, replacing the original encryption key information with modified encryption key information associated with the security device and communicating the server response to the client with the modified encryption key information associated with the security device.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
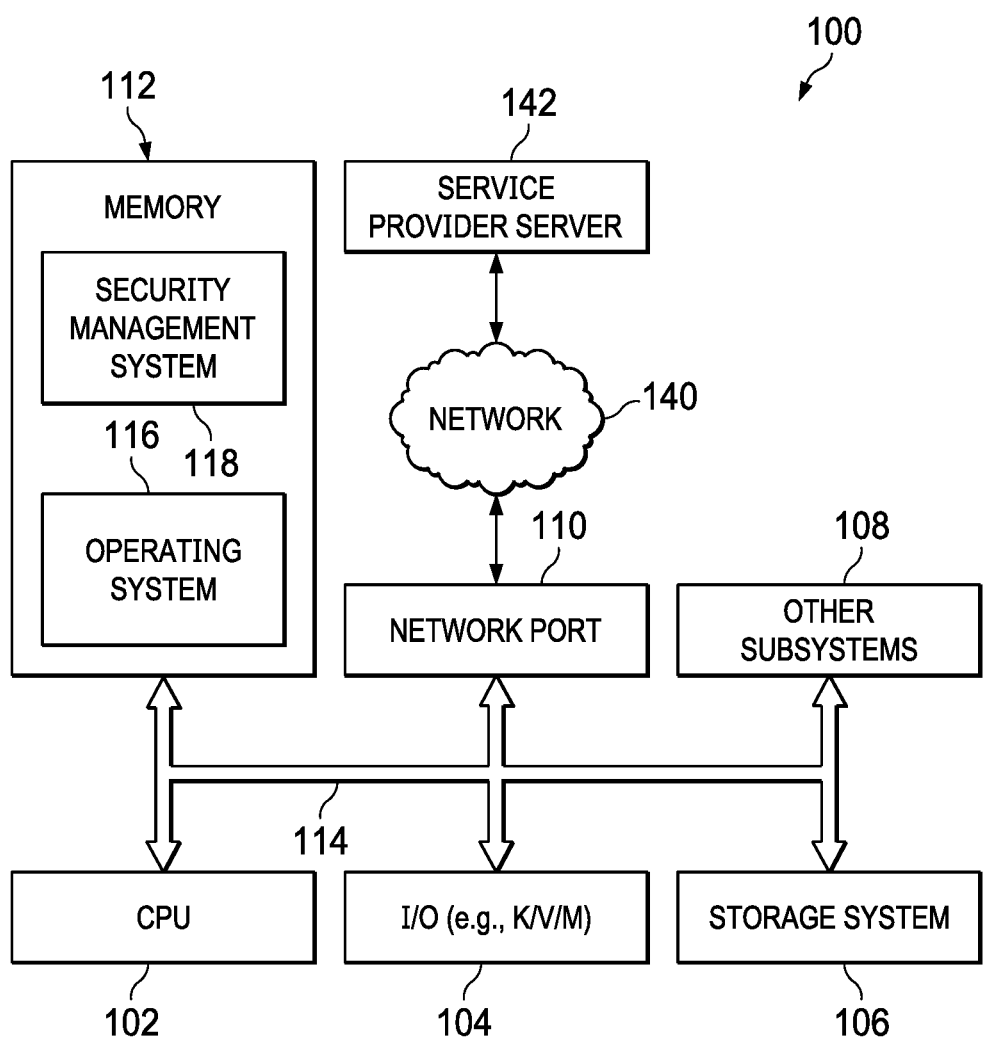
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a security management system 118. In some embodiments, information handling system 100 may be able to download security management system 118 from service provider server 142. In other embodiments, security management system 118 may be provided as a service from the service provider server 142.

In various embodiments, security management system 118 may be configured to enable encrypted Server Name Indication inspection, as described in greater detail below. In some embodiments, security management system 118 and the functionality thereof may improve processor efficiency, and thus the efficiency of information handling system 100, by performing network security operations with greater efficiency and with decreased processing resources as compared to existing approaches for similar network security operations. In these and other embodiments, security management system 118 and the functionality thereof may improve effectiveness in ensuring network security, and thus the effectiveness of information handling system 100, by performing network security operations with greater effectiveness as compared to existing approaches for similar network security operations. As will be appreciated, once information handling system 100 is configured to perform the functionality of security management system 118, information handling system 100 becomes a specialized computing device specifically configured to perform the functionality of security management system 118, and is not a general purpose computing device. Moreover, the implementation of functionality of security management system 118 on information handling system 100 may improve the functionality of information handling system 100 and provide a useful and concrete result of improving network security and performing network security operations with greater efficiency and with decreased processing resources.

Figure 2:
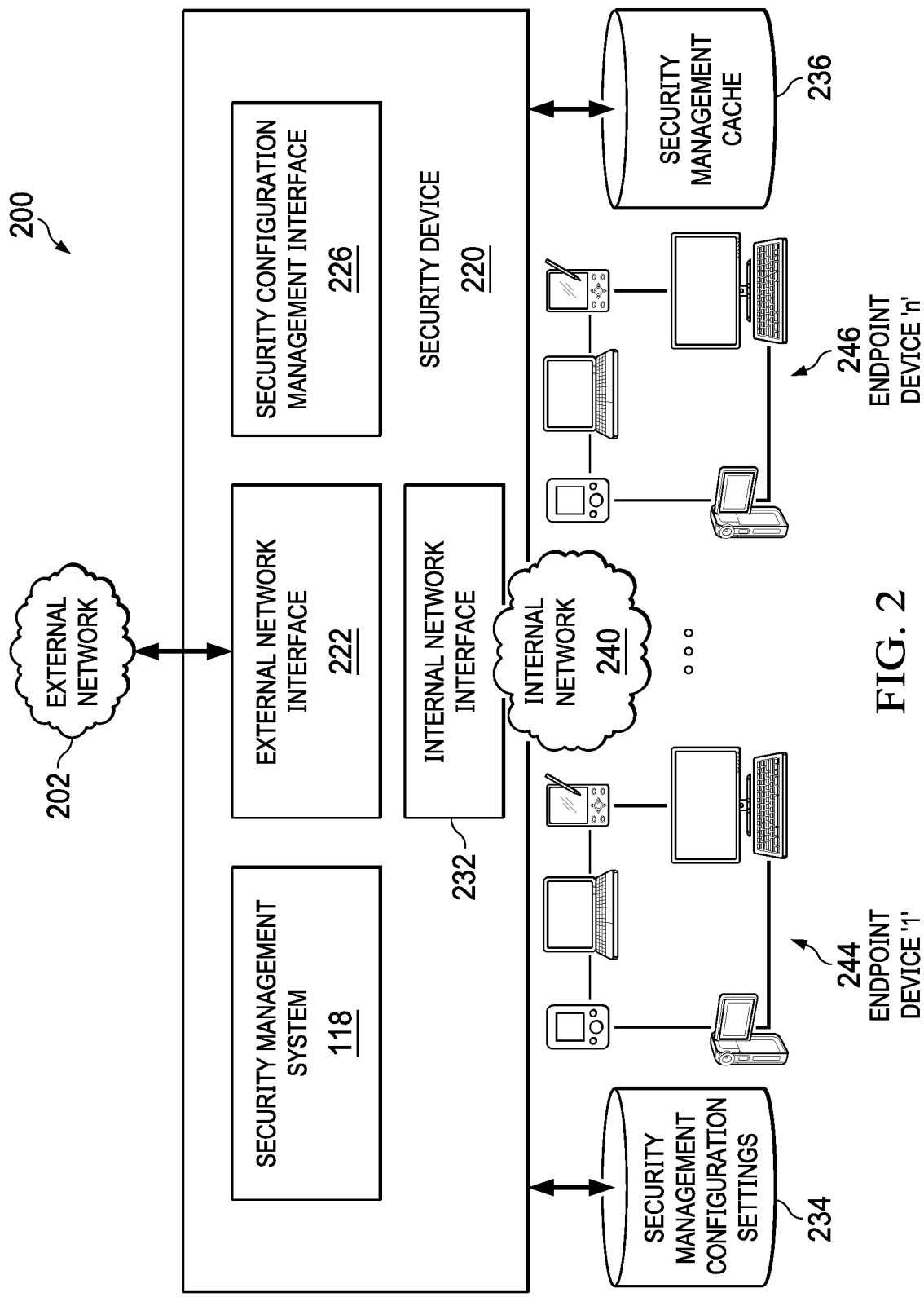
FIG. 2 illustrates a block diagram of a system for performing encrypted Server Name Indication inspection, in accordance with embodiments of the present disclosure.

FIG. 2 illustrates a block diagram of a system 200 for performing encrypted Server Name Indication inspection, in accordance with embodiments of the present disclosure. In some embodiments, a security device 220 may include an external network interface 222, a security configuration management interface 226, an internal network interface 232, and a security management system 118. Security device 220 may be implemented using any suitable information handling system 100, including without limitation a gateway, a firewall, an intrusion prevention system, an intrusion detection system, or any other suitable security device capable of implementing security management system 118.

In some embodiments, security device 220 may be implemented as an individual security device 220, a virtual context security device 220, or a security device 220 cluster.

Security device 220 may also include in some embodiments a repository of security management configuration settings 234 and a security management cache 236. In certain embodiments, security configuration management interface 226 may be implemented to receive instructions relating to network security policy decisions from security management system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a smart phone, a mobile telephone, a digital camera, a video camera, or other device capable of storing, processing and communicating data via a network, such as an internal network 240 interfaced to internal network interface 232. In various embodiments, the communication of the data may take place in real-time or near-real-time.

Embodiments of the invention may reflect an appreciation that network communication may represent an efficient means for communicating useful information. However, those of skill in the art will likewise appreciate that it may be desirable to secure such network communication to prevent malicious attacks on network components. Many existing solutions for providing security in a network environment have disadvantages, as described in the Background section of this application. However, security management system 118 as disclosed herein may overcome these disadvantages by enabling encrypted Server Name Indication inspection, as described herein.

Figure 3A:
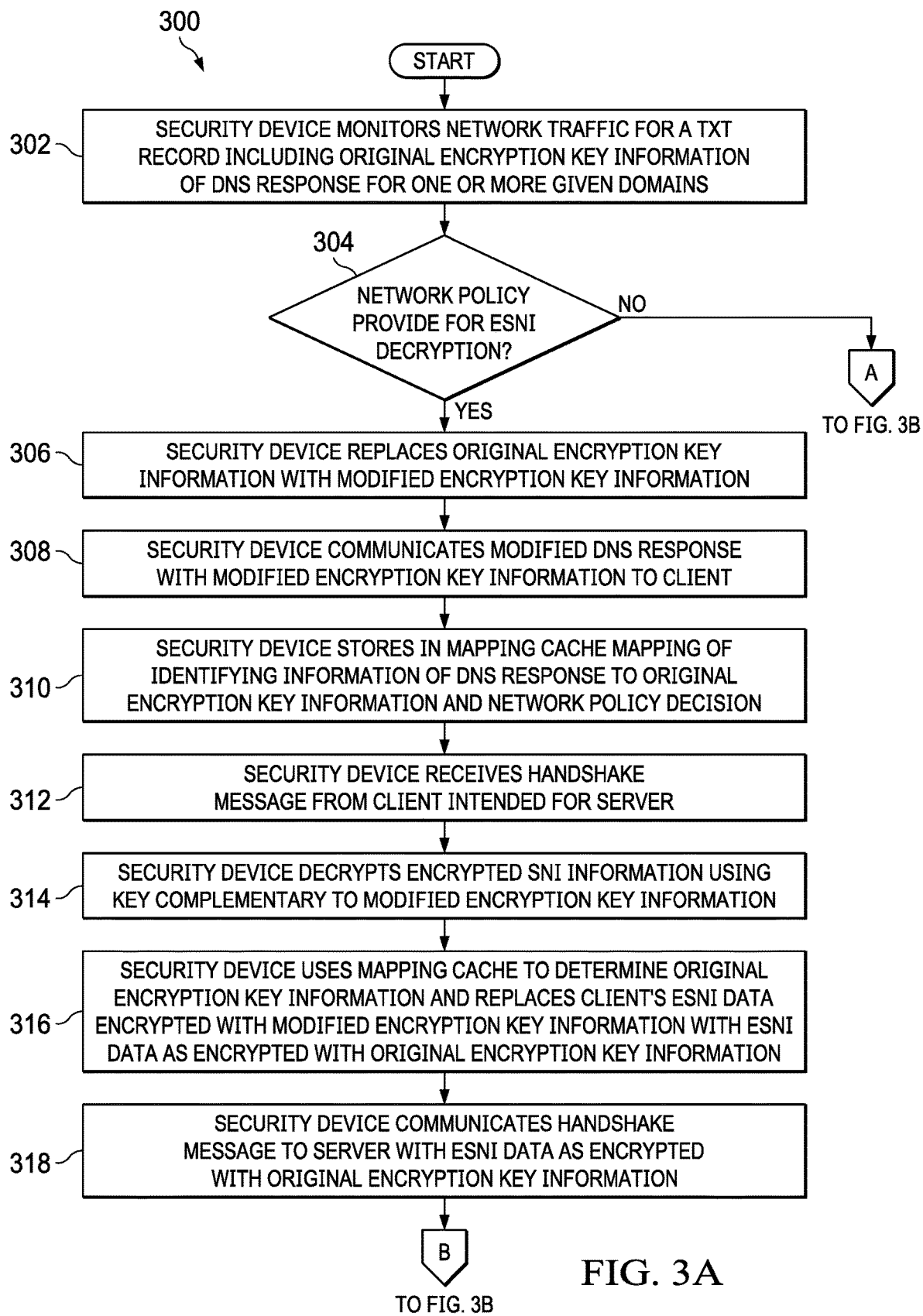
FIGS. 3A and 3B (which may be collectively referred to herein as "FIG. 3") illustrate a flow chart of an example method for performing encrypted Server Name Indication inspection, in accordance with embodiments of the present disclosure.
Figure 3B:
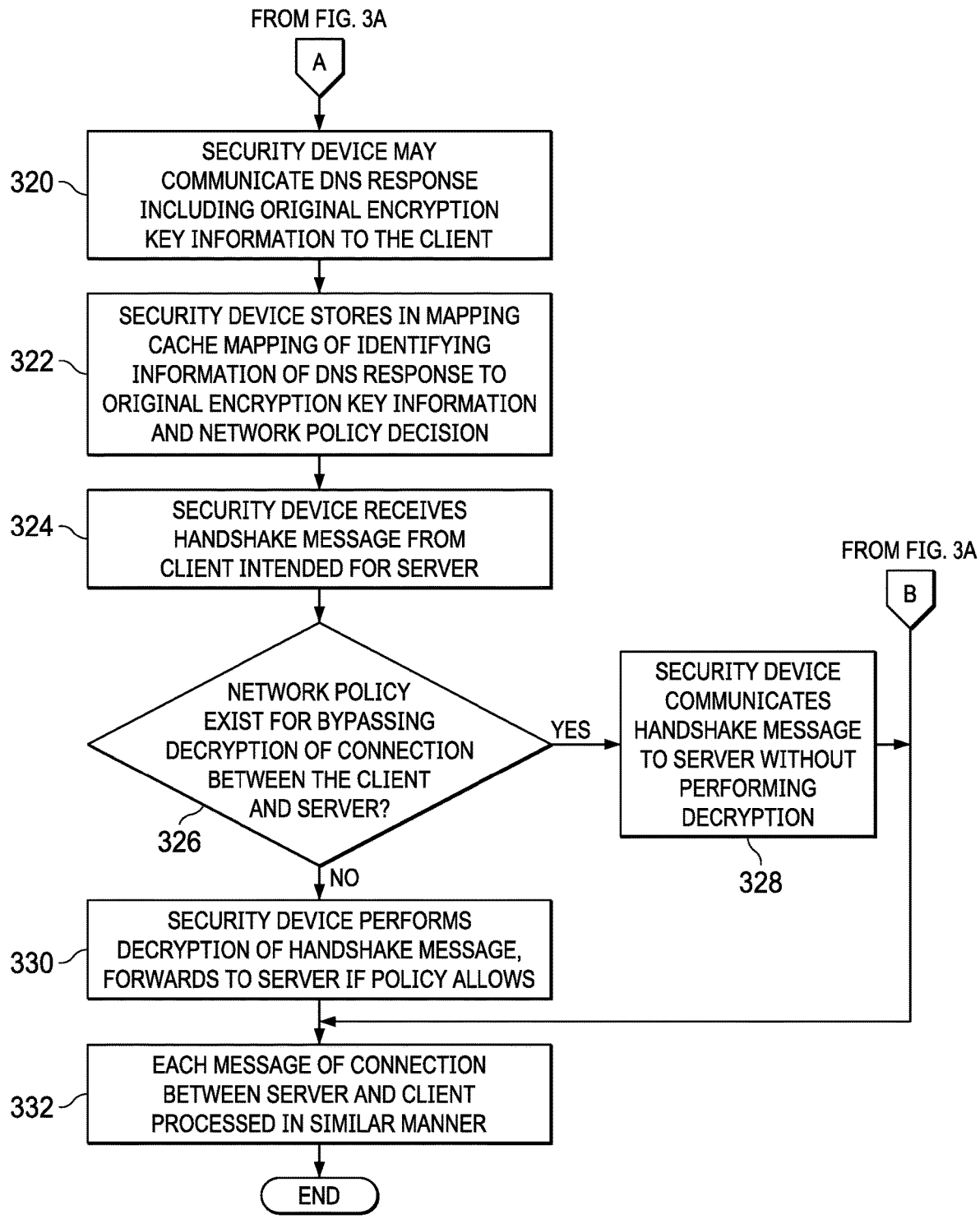

FIG. 3 illustrates a flow chart of an example method 300 for performing encrypted Server Name Indication inspection, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At step 302, a security device (e.g., security device 220, a gateway, etc.) may monitor network traffic for a TXT record including original encryption key (e.g., ESNIKeys) information in a DNS response for one or more given domains. Such DNS response may be communicated from a server (e.g., a server coupled to external network 202) to a client (e.g., an endpoint device 244, 246) in response to a client request to the server requesting the original encryption key associated with the server.

At step 304, the security device may consult its network policy (e.g., which may be stored as a part of security management configuration settings 234) to determine if the policy provides for ESNI decryption. If the policy provides for ESNI decryption, method 300 may proceed to step 306. Otherwise, if the policy does not provide for ESNI decryption, method 300 may proceed to step 320.

At step 306, in response to determining that the network policy provides for ESNI decryption, the security device may replace the original encryption key information of the DNS response with modified encryption key information. At step 308, the security device may communicate the modified DNS response with the modified encryption key information to the client, to ensure that the client will subsequently use the modified encryption key information to encrypt SNI in TLS handshake messages from the client to the server (e.g., in a TLS Client-Hello message).

At step 310, the security device may store in a mapping cache (e.g., in security management cache 236) a mapping of the original domain name and Internet Protocol (IP) address (and/or other identifying information) of the DNS response to the original encryption key information of the DNS response along with the network policy decision made by the security device with respect to the DNS response, thus caching such information for later use.

At step 312, the security device may receive a handshake message (e.g., a TLS Client-Hello message) from the client intended for the server, wherein such handshake message has encrypted SNI information based on the modified encryption key information. At step 314, the security device may decrypt the encrypted SNI information using a key complementary to the modified encryption key information, and may enforce a network policy and/or perform security monitoring based on such SNI information.

At step 316, the security device may use the mapping cache to determine the server's original encryption key information and based on such original encryption key information, replace the client's ESNI data that is encrypted with the modified encryption key information with the ESNI data as encrypted with the original encryption key information, thus generating ESNI data encrypted by the server's original encryption key information which the server can decrypt correctly. At step 318, the security device may communicate the handshake message with the ESNI data as encrypted with the original encryption key information to the server. After completion of step 318, method 300 may proceed to step 332.

At step 320, in response to determining that the network policy does not provide for ESNI decryption, the security device may communicate the DNS response including the original encryption key information to the client. At step 322, the security device may store in the mapping cache a mapping of the original domain name and Internet Protocol (IP) address (and/or other identifying information) of the DNS response to the original encryption key information of the DNS response along with the network policy decision made by the security device with respect to the DNS response, thus caching such information for later use.

At step 324, the security device may receive a handshake message (e.g., a TLS Client-Hello message) from the client intended for the server, wherein such handshake message has encrypted SNI information based on the original encryption key information, and thus, cannot decrypt ESNI. At step 326, the security device may perform a lookup into the mapping cache using the server's IP address to determine if a network policy exists with regard to decryption of the connection between the client and server. If a network policy exists to bypass decryption, method 300 may proceed to step 328. Otherwise, if no network policy exists to bypass decryption (either the network policy requires encryption or no entry exists in the mapping table for the IP address of the server), method 300 may proceed to step 330.

At step 328, the security device may communicate the handshake message to the server without performing decryption. After completion of step 328, method 300 may proceed to step 332.

At step 330, the security device may perform decryption of the handshake message (prior to communication of the handshake message to the server, if security policy allows after decryption) even though ESNI cannot be decrypted. In addition, in accordance with the draft standard for ESNI, the security device may remove the ESNI key information from the handshake message prior to decryption.

At step 332, the each message of the connection between server and client may be processed in a similar manner to the processing of handshake messages in the foregoing steps. After completion of step 332, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using CPU 102, security management system 118 executing thereon, and/or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A computer-implementable method for managing network communication, comprising:
   determining if a server response from a server received at a security device and intended for a client includes original encryption key information for encrypting identifying information associated with the server;
   if the server response includes original encryption key information for encrypting identifying information associated with the server, determining if a network policy provides for decryption of identifying information associated with the server; and
   if the network policy provides for decryption of identifying information associated with the server:
      replacing the original encryption key information with modified encryption key information associated with the security device; and
      communicating the server response to the client with the modified encryption key information associated with the security device.

2. The method of claim 1, further comprising:
   receiving at the security device a message from the client in response to the server response received by the client, the message including identifying information associated with the server encrypted with the modified encryption key information;
   decrypting the identifying information associated with the server encrypted with the modified encryption key information;
   encrypting the identifying information with the original encryption key information; and
   communicating the message to the server including the identifying information encrypted with the original encryption key information.

3. The method of claim 2, further comprising:
   responsive to receiving the server response, storing a mapping of identifying information associated with the server response to a mapping cache, wherein the mapping maps identifying information associated with the server response to the original encryption key information; and
   responsive to receiving the message, using the mapping cache to determine the original encryption key information for encrypting the identifying information with the original encryption key information.

4. The method of claim 1, further comprising, if the network policy does not provide for decryption of identifying information associated with the server, communicating the server response to the client with the original encryption key information.

5. The method of claim 4, further comprising:
receiving at the security device a message from the client in response to the server response received by the client, the message including identifying information associated with the server encrypted with the original encryption key information;
determining if a network policy exists for bypassing decryption of a connection between the server and the client;
if the network policy exists for bypassing decryption of the connection between the server and the client, communicating the message to the server without decryption; and
if no network policy exists for bypassing decryption of the connection between the server and the client, performing decryption of the message.

6. The method of claim 5, further comprising:
responsive to receiving the server response, storing a mapping of identifying information associated with the server response to a mapping cache, wherein the mapping maps identifying information associated with the server response to then network policy for the connection between the server and the client; and
responsive to receiving the message, using the mapping cache to determine whether the network policy exists for bypassing decryption of the connection between the server and the client.

7. The method of claim 1, wherein the server response comprises a Domain Name Service response.

8. The method of claim 1, wherein the identifying information associated with the server is a Server Name Indication associated with the server.

9. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
determining if a server response from a server received at a security device and intended for a client includes original encryption key information for encrypting identifying information associated with the server;
if the server response includes original encryption key information for encrypting identifying information associated with the server, determining if a network policy provides for decryption of identifying information associated with the server; and
if the network policy provides for decryption of identifying information associated with the server:
replacing the original encryption key information with modified encryption key information associated with the security device; and
communicating the server response to the client with the modified encryption key information associated with the security device.

10. The system of claim 9, the instructions further configured for:
receiving at the security device a message from the client in response to the server response received by the client, the message including identifying information associated with the server encrypted with the modified encryption key information;
decrypting the identifying information associated with the server encrypted with the modified encryption key information;
encrypting the identifying information with the original encryption key information; and
communicating the message to the server including the identifying information encrypted with the original encryption key information.

11. The system of claim 10, the instructions further configured for:
responsive to receiving the server response, storing a mapping of identifying information associated with the server response to a mapping cache, wherein the mapping maps identifying information associated with the server response to the original encryption key information; and
responsive to receiving the message, using the mapping cache to determine the original encryption key information for encrypting the identifying information with the original encryption key information.

12. The system of claim 9, the instructions further configured for, if the network policy does not provide for decryption of identifying information associated with the server, communicating the server response to the client with the original encryption key information.

13. The system of claim 12, the instructions further configured for:
receiving at the security device a message from the client in response to the server response received by the client, the message including identifying information associated with the server encrypted with the original encryption key information;
determining if a network policy exists for bypassing decryption of a connection between the server and the client;
if the network policy exists for bypassing decryption of the connection between the server and the client, communicating the message to the server without decryption; and
if no network policy exists for bypassing decryption of the connection between the server and the client, performing decryption of the message.

14. The system of claim 13, the instructions further configured for:
responsive to receiving the server response, storing a mapping of identifying information associated with the server response to a mapping cache, wherein the mapping maps identifying information associated with the server response to then network policy for the connection between the server and the client; and
responsive to receiving the message, using the mapping cache to determine whether the network policy exists for bypassing decryption of the connection between the server and the client.

15. The system of claim 9, wherein the server response comprises a Domain Name Service response.

16. The system of claim 9, wherein the identifying information associated with the server is a Server Name Indication associated with the server.

17. A non-transitory, computer-readable storage medium embodying computer program code, the computer program code comprising computer executable instructions configured for:
determining if a server response from a server received at a security device and intended for a client includes original encryption key information for encrypting identifying information associated with the server;

if the server response includes original encryption key information for encrypting identifying information associated with the server, determining if a network policy provides for decryption of identifying information associated with the server; and if the network policy provides for decryption of identifying information associated with the server:

replacing the original encryption key information with modified encryption key information associated with the security device; and communicating the server response to the client with the modified encryption key information associated with the security device.

18. The storage medium of claim 17, the instructions further configured for:

receiving at the security device a message from the client in response to the server response received by the client, the message including identifying information associated with the server encrypted with the modified encryption key information;

decrypting the identifying information associated with the server encrypted with the modified encryption key information;

encrypting the identifying information with the original encryption key information; and communicating the message to the server including the identifying information encrypted with the original encryption key information.

19. The storage medium of claim 18, the instructions further configured for:

responsive to receiving the server response, storing a mapping of identifying information associated with the server response to a mapping cache, wherein the mapping maps identifying information associated with the server response to the original encryption key information; and responsive to receiving the message, using the mapping cache to determine the original encryption key information for encrypting the identifying information with the original encryption key information.

20. The storage medium of claim 17, the instructions further configured for, if the network policy does not provide for decryption of identifying information associated with the server, communicating the server response to the client with the original encryption key information.

21. The storage medium of claim 20, the instructions further configured for:

receiving at the security device a message from the client in response to the server response received by the client, the message including identifying information associated with the server encrypted with the original encryption key information;

determining if a network policy exists for bypassing decryption of a connection between the server and the client;

if the network policy exists for bypassing decryption of the connection between the server and the client, communicating the message to the server without decryption; and if no network policy exists for bypassing decryption of the connection between the server and the client, performing decryption of the message.

22. The storage medium of claim 21, the instructions further configured for:

responsive to receiving the server response, storing a mapping of identifying information associated with the server response to a mapping cache, wherein the mapping maps identifying information associated with the server response to then network policy for the connection between the server and the client; and responsive to receiving the message, using the mapping cache to determine whether the network policy exists for bypassing decryption of the connection between the server and the client.

23. The storage medium of claim 17, wherein the server response comprises a Domain Name Service response.

24. The storage medium of claim 17, wherein the identifying information associated with the server is a Server Name Indication associated with the server.

* * * * *